United States Patent
Villasenor

(10) Patent No.: US 10,650,295 B1
(45) Date of Patent: May 12, 2020

(54) ORGANIZING UNIT FOR BARCODE TAGS

(71) Applicant: Adam Villasenor, Visalia, CA (US)

(72) Inventor: Adam Villasenor, Visalia, CA (US)

( * ) Notice: Subject to any disclaimer, the term of this patent is extended or adjusted under 35 U.S.C. 154(b) by 0 days.

(21) Appl. No.: 16/174,559

(22) Filed: Oct. 30, 2018

(51) Int. Cl.
*G06K 19/06* (2006.01)

(52) U.S. Cl.
CPC . *G06K 19/06046* (2013.01); *G06K 19/06028* (2013.01)

(58) Field of Classification Search
CPC .............. G06K 19/06046; G06K 19/06028
See application file for complete search history.

(56) References Cited

U.S. PATENT DOCUMENTS

| | | | | |
|---|---|---|---|---|
| 5,318,177 A * | 6/1994 | Isacson | ............... | A45C 15/00 206/38.1 |
| 7,249,715 B1 * | 7/2007 | Lambright | ........... | A45C 11/182 235/487 |
| 7,597,264 B2 * | 10/2009 | Newbrough | ............... | B67B 7/16 235/375 |
| 8,464,865 B1 * | 6/2013 | DuMont | ............... | A45C 11/182 206/37 |
| 2004/0169088 A1 * | 9/2004 | Nelms | ................... | A45C 11/182 235/493 |
| 2018/0310681 A1 * | 11/2018 | Wingerter | ............ | A45C 11/182 |

\* cited by examiner

*Primary Examiner* — Sonji N Johnson
(74) *Attorney, Agent, or Firm* — Sanchelima & Associates, P.A.; Christian Sanchelima; Jesus Sanchelima

(57) ABSTRACT

The present invention is an organizing unit for barcode tags. The organizing unit includes a housing divided into two parts, an upper member and a lower member. The upper member and the lower member are generally L-shaped members joined together such that a space is formed therebetween in which multiple barcode tags are arranged and stacked on top of each other. Each of the barcode tags includes an aperture, and further the upper member and the lower member include apertures formed therein. A ring may be coupled with the housing, by engaging with the apertures, such that the barcode tags pivot about the ring to be retracted in and out of the space, as and when desired.

12 Claims, 3 Drawing Sheets

ORGANIZING UNIT FOR BARCODE TAGS

BACKGROUND OF THE INVENTION

1. Field of the Invention

The present disclosure generally relates to an organizing unit for organizing barcode tags, and more particularly, relates to organizing unit in the form of a key holder which is configured for organizing barcode tags for preventing scratching and wearing of printed barcodes or pasted barcode labels thereon.

2. Description of the Related Art

Barcodes include codes consisting of a group of printed and variously patterned bars and spaces, and sometimes numerals that is designed to be scanned and read into computer memory for identification purposes. Barcodes usually consist of a combination of thick bars and thin bars (binary level), or a combination of varying width bars and gaps between the bars (multi-level). Barcodes such as the UPC have become a ubiquitous element of modern civilization, as evidenced by their enthusiastic adoption by stores around the world. For instance, barcodes including information about price, inventory and so on are widely printed on consumer item packaging, and which are scanned at the check-out counter photo-electrically or by laser, or otherwise.

Some applications also implement barcode tags which are formed by printing the barcode or pasting a barcode label on a metal or plastic plate. These barcode tags can be utilized for a wide range of identification routines and purposes. In one example, such barcode tags may be configured as keys for security authentication at various locks, for example for gaining access to one or more rooms in a building. In another example, the barcode tags may find use in military applications, such as, for carrying identification information or codes for providing different levels of access in an operation or the like. These barcode tags are typically small, portable and solid units which can be carried around by a user for gaining physical access to a site and/or for performing some digital authentication operations and the like.

In some cases, a user may have to carry multiple barcode tags therewith, pretty much all the time. Typically, in such cases, a user resorts to the option of putting and lumping together the various barcode tags in one or more pockets of the clothing worn for that day. In some cases, a user may group the multiple barcode tags together and put an elastic band or the like around the group for organizing the barcode tags. However, in both such cases, the barcodes printed on the barcode tags are exposed to and may come in contact with some sharp objects that may be present in the pocket. This may result in the barcode printed on these barcode tags to get scratched with time, if not been taken proper care of. This scratching may cause the code in the barcode to be unreadable, i.e. the code is therefore indistinct and the encoded data is garbled, so to speak. Also, it becomes inconvenient for a user to manage one or more of such barcode tags, and there is further a higher probability that one or more of the barcode tags being misplaced due to lack of any proper organizing means.

Thus, there is needed of an organizing device for the barcode tags which can also prevent wear and tear of these barcode tags. Documents describing the closest subject matter provide for a number of more or less complicated features that fail to solve the problems described above in an efficient and economical way. None of the documents suggest the novel features of the present invention.

SUMMARY OF THE INVENTION

It is one of the main objectives of the present invention to provide an organizing unit in the form of a key holder which, in addition, to providing means for organizing multiple keys, also provide means for organizing multiple barcode tags therein.

It is another objective of the present invention to provide an organizing unit which can securely hold multiple barcode tags, yet provide functionality to retract any one of the barcode tags in order to allow usage of that particular barcode tag, as and when desired.

It is yet another objective of the present invention to provide an organizing unit which is of relatively simple design, inexpensive, durable and further easy to manufacture.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Illustrative embodiments of the present invention are described below. The following explanation provides specific details for a thorough understanding of and enabling description for these embodiments. One skilled in the art will understand that the invention may be practiced without such details. In some instances, well-known structures, processes and functions have not been shown or described in detail to avoid unnecessarily obscuring the description of the embodiments.

It shall be noted that unless the context clearly requires otherwise, throughout the description, the words "comprise," "comprising," "include," "including," and the like are to be construed in an inclusive sense as opposed to an exclusive or exhaustive sense; that is to say, in the sense of "including, but not limited to." Words using the singular or plural number also include the plural or singular number, respectively while adhering to the concepts of the present invention. Furthermore, references to "one embodiment" and "an embodiment" are not intended to be interpreted as excluding the existence of additional embodiments that also incorporate the recited features.

Figure 1:
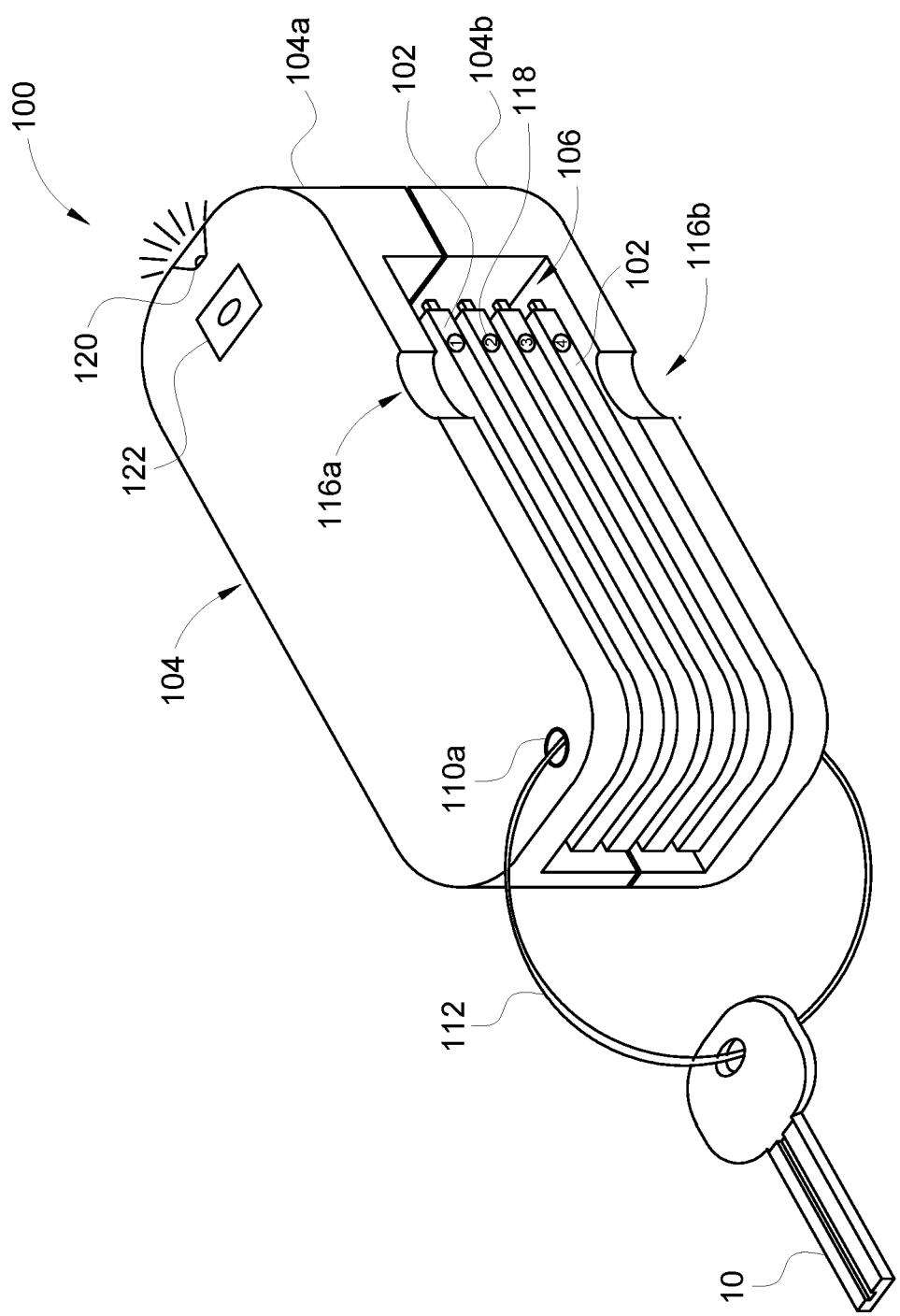
FIG. 1 illustrates a diagrammatic perspective view of an organizing unit 100 in the form of a key holder having multiple barcode tags 102 arranged therein, in accordance with one or more embodiments of the present invention.

Referring to the drawings, FIG. 1 illustrates a diagrammatic view of an organizing unit (referred generally by the numeral 100), in accordance with one or more embodiments of the present disclosure. The organizing unit 100 of the present disclosure is utilized for organizing multiple barcodes using barcode tags 102 which are in the form of plates (shown more clearly in the accompanied FIG. 3). The barcode tag 102 may be formed of a plastic or metal plate with a requisite barcode 102a printed thereon, or a barcode 102a in the form of a label pasted on an upper surface thereof. Alternatively, the barcode 102a may be in the form of a metal sheet which may be slid into the barcode tag 102 (as discussed later). In an example, the barcode tags 102 may be designed for industrial applications such that the barcode tags 102 can perform in the harshest environments, including chemicals, cleaning processes, painting processes, outdoor exposure and high temperatures.

Figure 3:
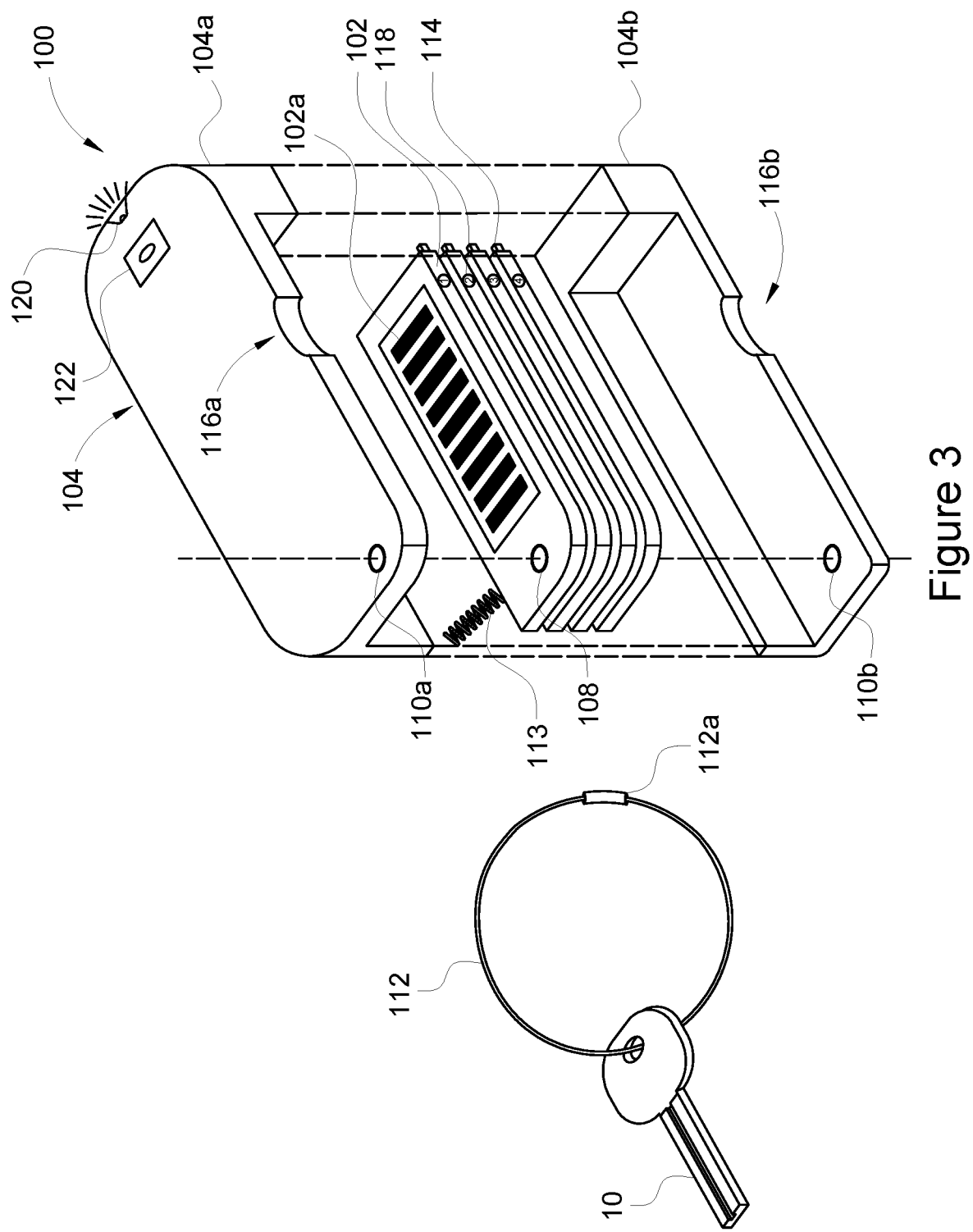
FIG. 3 illustrates a diagrammatic exploded view of the organizing unit 100 of FIG. 1, in accordance with one or more embodiments of the present invention.

As illustrated in FIG. 3, the barcode tags 102 are generally rectangular in shape with optional chamfered and rounded off edges to prevent risk of cuts to the user while retracting in and out the barcode tags 102 in the organizing unit 100 (as discussed in the subsequent paragraphs). In the present disclosure, the organizing unit 100 is shown in the form of a key holder which is depicted as holding a key 10. It may be contemplated that in other examples, the organizing unit 100 may not necessarily need to be in the form of a key holder to be used for holding keys, such as the key 10, or the like without affecting the scope of the present disclosure.

Figure 2:
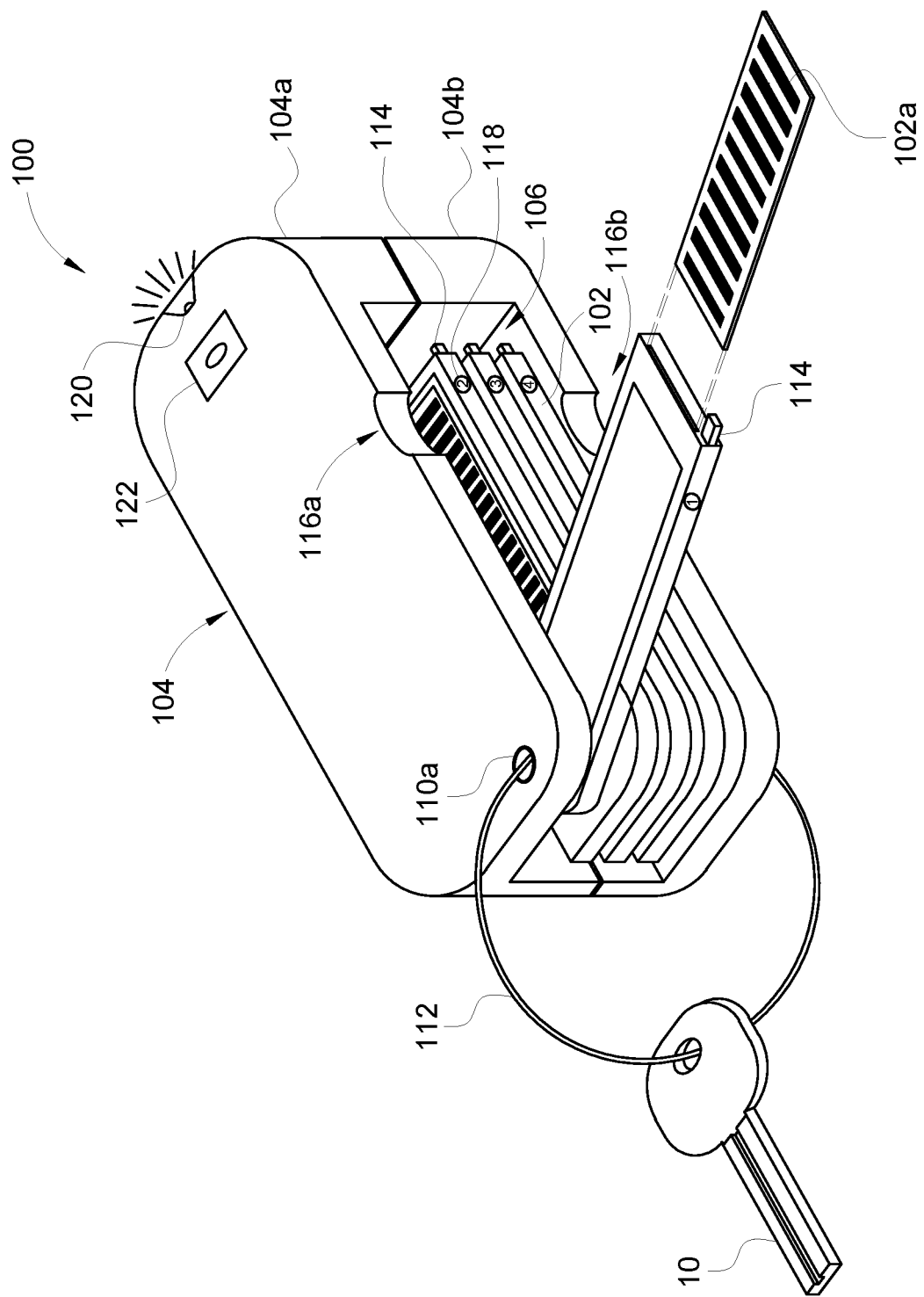
FIG. 2 illustrates a diagrammatic perspective view of the organizing unit 100 of FIG. 1 with one of the multiple barcode tags 102 in a retracted out position, in accordance with one or more embodiments of the present invention.

As illustrated in FIGS. 1-3, the organizing unit 100 includes a housing 104. The housing 104 generally includes two parts, an upper member 104a and a lower member 104b. The two parts, the upper member 104a and the lower member 104b, are generally L-shaped members joined together such that a space 106 is formed therebetween. The space 106 allows to hold and arrange multiple barcode tags 102 therein. In one example, the housing 104 may be about 1.25 inches by 1 inch by 3.5 inches in dimensions. It may be understood that the given dimensions are exemplary only and shall not be construed as limiting to the disclosure in any manner.

Further, as illustrated, the barcode tags 102 are stacked on top of each other in the space 106. The space 106 may be defined to have a sufficient volume to allow arranging of required number of barcode tags 102 therein. In the illustrated examples, the organizing unit 100 is shown to hold and arrange four number of barcode tags 102 in the space 106 of the housing 104 thereof; but it may be contemplated that the housing 104 may be designed to have larger space 106 to allow arranging of more number of barcode tags, such as the barcode tags 102, therein without any limitations. Further, as may be seen from FIG. 2, the barcode 102a may be removed from sliding out from the barcode tag 102 if required; such as, for example, for replacing the barcode 102a or the like. It shall be appreciated that the barcode tags 102 may have slots (not labeled) defined therein to allow to accommodate the barcodes 102a therein. Such slots may generally be of dimensions to easily accommodate the commonly sized barcodes 102a; however, the slots of some of the barcode tags 102 may be customized to accommodate smaller or larger barcodes 102a without departing from the scope of the present disclosure. Further, the barcode tags 102 may have small windows (not shown) to see logos or the like on the barcodes 102a inserted therein.

In one example, each of the barcode tags 102 may include an aperture 108 (as shown more clearly in FIG. 3) formed at one end thereof. Further, the housing 104, or specifically, the upper member 104a and the lower member 104b, may include apertures 110a and 110b, respectively, formed therein. As illustrated in FIGS. 1-2, a ring 112 may be coupled with the housing 104 such that the ring 112 passes through the aperture 108 in the barcodes tags 102 and also the two apertures 110a and 110b in the housing 104. Specifically, the ring 112 may first pass through the first aperture 110a, then each of the apertures 108 in the various barcode tags 102, and finally out from the aperture 110b. The ring 112 in the form of loop may be wound with steel wire of two or three turns to have an elastic force. To hold a key, such as the key 10, into the ring 112, the key 10 is rotated along the two-turns loop of the ring 112. The ring 112 may further include a lock 112a (shown in FIG. 3) to securely couple the ring 112 with the housing 104, thus preventing removal of the barcode tags 102 from the organizing unit 100. This way the barcode tags 102 are held and secured in the housing 104.

It may be understood that such arrangement may allow the barcode tags 102 to pivot about the ring 112. Further, as illustrated in FIG. 3, each of the barcode tags 102 is constrained to the housing 104 by means of a spring 113. The springs 113 bias the barcode tags 102 to retract back into the housing 104 when the force applied for pulling out therefrom is removed. This way the barcode tags 102 may easily be pivoted to be retracted out of the space 106 in the housing 104 (as shown in FIG. 2), and further may retract or pushed back into the space 106 of the housing 104 (as shown in FIG. 1). In some examples, the barcode tags 102 may have a sunken in and rounded invert shape (not shown) to hold and accommodate movement of the spring 113. It shall be appreciated that each of the barcode tags 102 may have its own spring 113; but only one is shown in the drawings. The position and shape of the spring 113 as shown is exemplary only and shall not be construed as limiting to the present disclosure. In one or more examples, the organizing unit 100 may include a lock strap or a push lock (not shown) to retain the barcode tags 102 in the space 106 of the housing 104, and preventing possible accidental retraction thereof out of the space 106 of the housing 104.

In some examples, the barcode tags 102 may include projections 114 extending outwards from opposite side to that of where the aperture 108 is formed. The projections 114 may aid the user to insert one of his/her finger or nail in the space 106 to retract out the selected barcode tag 102, as and when desired. Further, in some examples, the housing 104 may include curved cut-outs 116a and 116b formed in the upper member 104a and the lower member 104b respectively, proximal to location of the projections 114 when the barcode tags 102 are retracted into the space 106 for enabling the user to insert one of his/her finger or nail in the space 106 to retract out the selected barcode tag 102, as and when desired. In one or more examples, each of the barcode tags 102 may include indicia 118, in the form of a numeral or the like, formed on one of the exposed edge thereof, for reference of the user while selecting the required barcode tag 102 from the multiple barcode tags 102 arranged therein.

Further, in some examples, the organizing unit 100 may include a light bulb 120 arranged at one of the ends of the housing 104. In the illustrated examples, the light bulb 120 is arranged at opposite end to which the ring 112 is mounted. Further, a power button 122 is provided on a top face (same as to where the light bulb 120 may be provided) of the housing 104. The power button 122 may be implemented for turning ON and OFF the light bulb 120 as required, thus configuring the organizing unit 100 to be utilized as a flashlight in case of an emergency or the like. The organizing unit 100 may further include a battery (not shown), in the form of button cell or the like, arranged in the housing 104 to provide power for operation of the light bulb 120.

The organizing unit 100 of the preset disclosure allows the user to arrange his/her multiple barcode tags 102 therein. When the user wishes to use a particular barcode tag, the user may simply pull out that particular barcode tag 102 from the space 106 in the housing 104. After use, like scanning of the barcode tag 102, the user may push back the barcode tag 102 into the space 106. Since the barcode tags 102 are always arranged in a particular order/sequence, it becomes easy for user to remember the position of each of the barcode tags 102 in the stack, thus helping the user to quickly find and pull out the required barcode tag 102. Further, since the barcode tags 102 are arranged in the space 106 of the housing 104, therefore the barcode tags 102, or specifically, the barcode 102a in the barcode tags 102, may not come in direct contact with sharp objects which may be present in the pocket of the user where the organizing unit 100 is located, and thus prevent scratching and beating, and possible wear and tear, of the barcode tags 102. In some examples, the organizing unit 100 may be a multi-function device which in addition to holding keys, such as key 10, and organizing multiple barcode tags 102 may also include other features, like incorporating some tools, as are available in Swiss knives which are well known in the art.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense in any manner.

What is claimed is:

1. An organizing unit for organizing multiple barcodes, comprising:
a housing with a space formed therein, said housing having an upper member and a lower member joined together such that a space is formed therebetween, wherein said housing further includes open sidewalls extending partially along a sidewall of said housing and a bottom end of said housing, wherein said upper member and said lower member includes a vertical wall extending from a side and an upper end; and
one or more barcode tags in the form of retractable sleeves hingedly mounted within said housing and stacked on top of each other therein, wherein said retractable sleeves have an open position and a closed position, wherein said retractable sleeves are all parallel in the closed position, wherein said retractable sleeves are hollow bodies having a window located on a top end, wherein said window is rectangular in shape, wherein said retractable sleeves further include an opening at a top most distal end, wherein each of the one or more retractable sleeves is configured to be independently retracted out and back into the space through said opening, and wherein each of said retractable sleeves is adapted to accommodate at least one barcode therein, wherein said at least one barcode rests within said retractable sleeves, wherein said at least one barcode is entirely in view from said window, wherein each of said retractable sleeves include a projection extending outwards from a side thereof, wherein said projections are cubic in shape, wherein said projections are located near said open sidewalls, wherein said projections are configured to receive a user's nail to provide a user with the most optimal method in retracting said barcode tags from said housing.

2. The organizing unit of claim 1, wherein:
each of the one or more barcode tags include an aperture formed at one end thereof;
the upper member and the lower member, of the housing, include corresponding apertures formed therein; and
a ring coupled with the housing such that the ring passes through the apertures in each of the one or more barcodes tags and the two apertures in the housing, wherein said ring further includes a key mounted thereon.

3. The organizing unit of claim 2, wherein the ring includes a lock for secure coupling thereof with the housing.

4. The organizing unit of claim 1, wherein the barcode is removably slidably arranged in the barcode tag.

5. The organizing unit of claim 1, wherein each of the one or more barcode tags is constrained to the housing by a spring biasing the one or more barcode tags to retract back into the housing.

6. The organizing unit of claim 1, wherein the housing includes curved cut-outs formed in the upper member and the lower member respectively and proximal to the projections.

7. The organizing unit of claim 1, wherein each of the barcode tags include indicia in the form of a numeral and formed on one of exposed edge thereof.

8. The organizing unit of claim 1, wherein the one or more barcode tags are formed of a plastic or metal material.

9. The organizing unit of claim 1, wherein the one or more barcode tags are generally rectangular in shape.

10. The organizing unit of claim 9, wherein the one or more barcode tags have chamfered and rounded off edges.

11. The organizing unit of claim 1 further comprising:
a light bulb arranged at one of ends of the housing, wherein said light bulb is located on an front end of said upper member of said housing; and
a power button being rectangular in shape provided on the housing and implemented for turning ON and OFF the light bulb, wherein said power button is located directly below said light bulb configured to provide a user with the most ergonomic location for turning ON and OFF said light bulb when a user is carrying said housing.

12. An organizing unit for organizing multiple barcodes, comprising:
a housing comprising an upper member and a lower member joined together such that a space is formed therebetween, said housing having an upper member and a lower member joined together such that a space is formed therebetween, wherein said upper member and lower member have the same shape and size, wherein said housing further includes open sidewalls extending partially along a sidewall of said housing and a bottom end of said housing, wherein said upper member and said lower member includes a vertical wall extending from a side and an upper end;
one or more barcode tags in the form of plates arranged in the space and stacked on top of each other therein;
each of the one or more barcode tags include an aperture formed at one end thereof;
the upper member and the lower member, of the housing, include corresponding apertures formed therein; and
a ring coupled with the housing such that the ring passes through the apertures in each of the one or more barcodes tags and the two apertures in the housing,
wherein each of the one or more barcode tags is configured to be independently retracted out and back into the space, and wherein each of the one or more barcode tags is adapted to accommodate at least one barcode therein.

\* \* \* \* \*